April 10, 1956  A. E. JOHNSTON  2,741,062
ANIMAL TRANSFER TRAP
Filed May 26, 1954  2 Sheets-Sheet 1
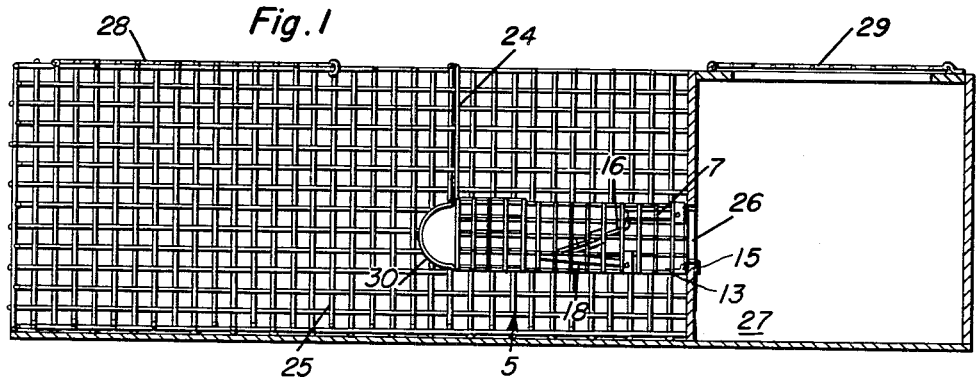
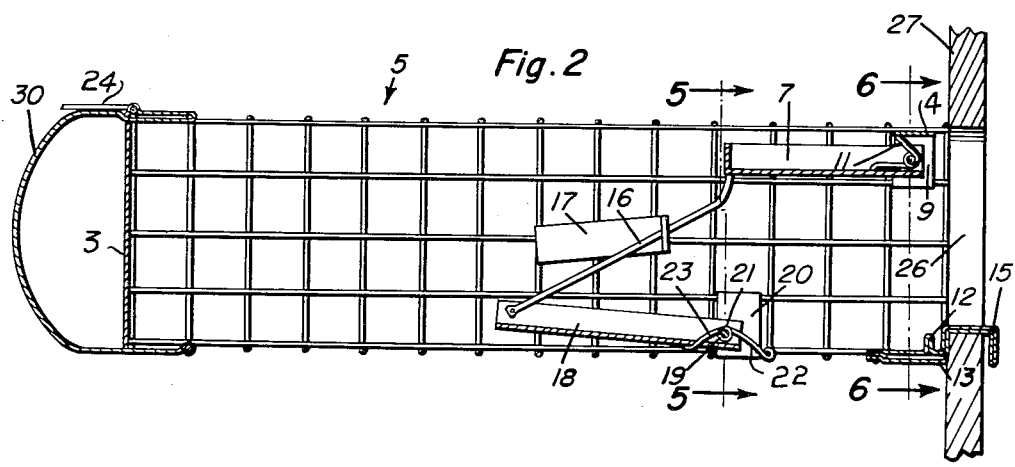
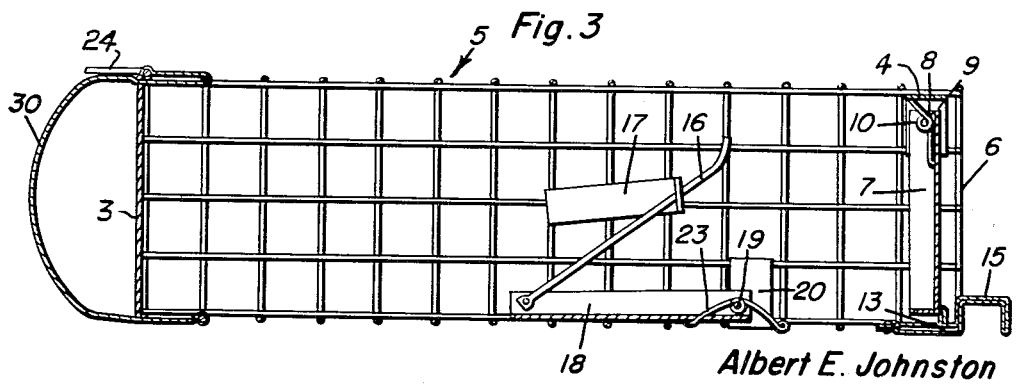
Albert E. Johnston
INVENTOR.

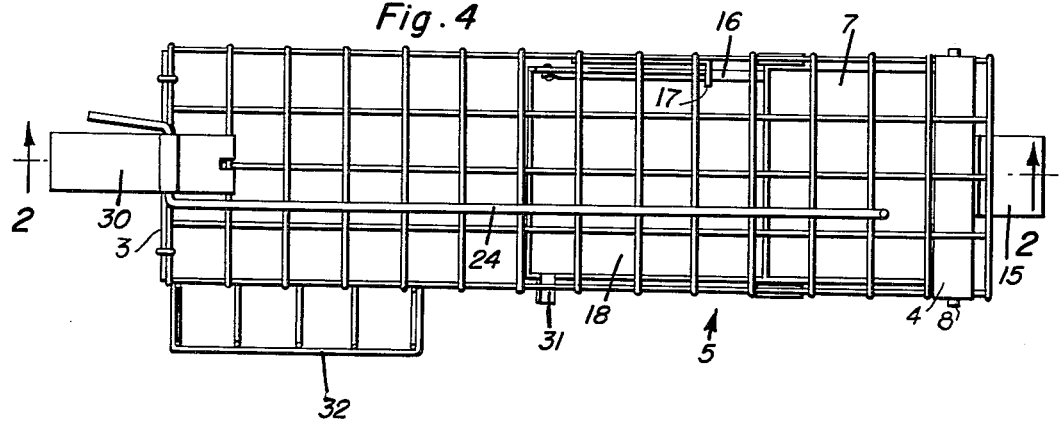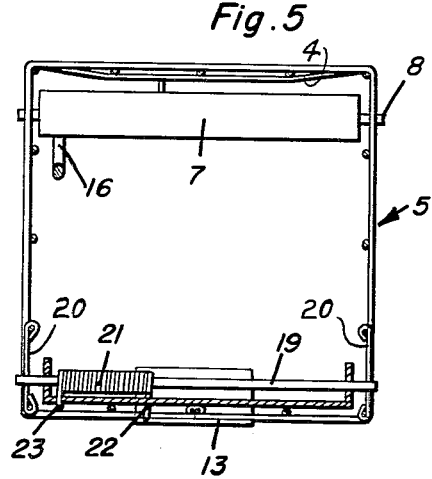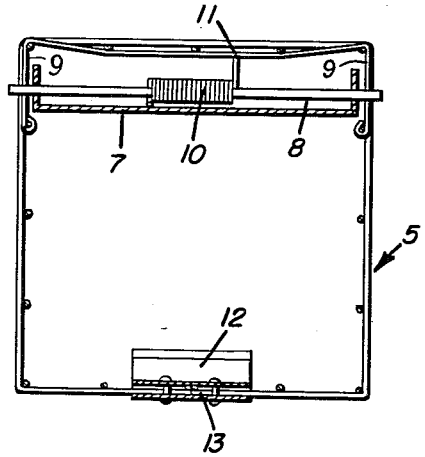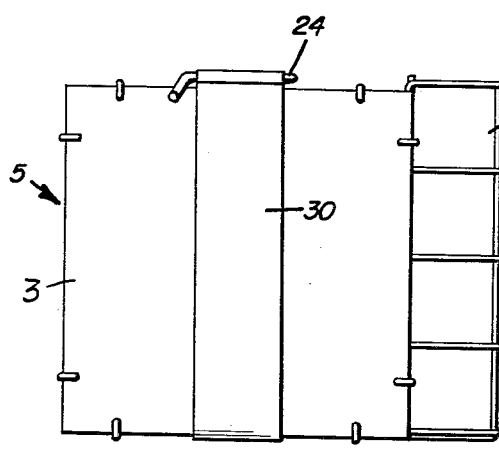
Albert E. Johnston
INVENTOR.

United States Patent Office 2,741,062
Patented Apr. 10, 1956

2,741,062

ANIMAL TRANSFER TRAP

Albert E. Johnston, Warroad, Minn.

Application May 26, 1954, Serial No. 432,361

1 Claim. (Cl. 43—61)

The present invention relates to new and useful improvements in animal traps for use primarily in transferring mink and other animals from one cage to another or for inspection purposes.

An important object of the invention is to provide a trap cage adapted to be removably attached to the entrance of a nest in a relatively larger animal housing cage to facilitate removal of the animal without the danger of picking up the animal with the hands.

Another object is to provide a device of this character of simple and practical construction, which is efficient and reliable in operation, relatively inexpensive to manufacture and otherwise well adapted for the purpose for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal sectional view of the housing cage and nest showing the trap cage attached thereto;

Figure 2 is an enlarged longitudinal sectional view of the trap cage showing the trigger in set position;

Figure 3 is a similar view showing the trigger released to close the door;

Figure 4 is an enlarged top plan view of the trap cage;

Figures 5 and 6 are enlarged transverse sectional views taken respectively on the lines 5—5 and 6—6 of Figure 2; and Figure 7 is a rear elevational view of the trap cage.

Referring now to the drawings in detail, wherein for the purpose of illustration I have disclosed a preferred embodiment of my invention, the numeral 5 designates a wire trap cage of rectangular shape and having an open front end 6 adjacent which a door 7 is vertically swingably supported at its upper edge by a rod 8 positioned transversely at the upper portion of the cage and supported in the depending end portions 9 of a metallic bar 4 mounted transversely at the top of the cage 5. A plate 3 closes the rear end of the cage 5 and may be secured thereon in any suitable manner. A wire coil spring 10 is positioned on the rod with one end 11 of the spring bearing against the bar 4 and with the other end of the spring engaged behind the door to tensionally hold the door in a closed lowered positioned. The lower edge of the door is closed against a stop 12 which rises from a supporting bracket 13 composed of a metal plate bent upon itself in clamping engagement with the wire strands at the bottom of the cage and having a forwardly projecting hooked end portion 15.

The door is held in its set open position by a vertically inclined trip rod 16 which is slidable in a guide 17 secured to one side of the cage and with the upper end of the rod engaged under the door. The lower end of the rod is pivoted to the rear portion of a platform 18 which has its front portion rockably supported on a transverse rod 19 having its end portions supported in bearing plates 20 at the lower side portions of the cage. A wire coil spring 21 is positioned on rod 19 with one end 22 of the spring anchored to the bottom of the cage and with the other end 23 of the spring engaged under the bottom of the platform to raise the same. A stop 31 on the platform engages one of the strands of the cage 5 to limit raising movement of the platform.

A hanger hook 24 is attached at its lower end to rear top portion of the cage 5 and with the upper end of the hook adapted for detachable engagement with the top of a main wire animal housing cage 25 to support the trap cage 5 at the entrance 26 of a nest 27 constructed at one end of the housing cage. The forwardly projecting end 15 of the supporting bracket 13 of trap cage 5 is hooked over the wall of the entrance opening 26 of the housing cage to rest on the bottom edge of the entrance to support and lock the front end of the trap cage in the entrance to the nest.

In the operation of the device, the trap cage 5 is placed in the housing cage 25 through the usual door 28 at the top of the latter to attach the trap cage at the entrance 26 of the nest 27. The door 7 is set in its open raised position by engaging trip rod 16 under the door, as shown in Figure 2. The cover or door 29 of the nest is then opened to chase the mink or other animal from the nest into the trap cage 5, whereupon the weight of the animal in passing over the platform 18 will lower the latter to release trip rod 16 and permit spring 10 to close the door 7.

The rear end of the trap cage is provided with a handle 30 to facilitate lifting of the trap cage for removal thereof from the housing cage 25 and with the animal trapped in the trap cage.

A wire record holder 32 is constructed adjacent the rear end of the trap cage 5.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

For use in conjunction with a wire housing and a receptacle defining a nest connected thereto, said receptacle having an opening therein communicating with said housing, an animal transfer trap comprising: an elongated foraminous cage closed at its rear end and open at its forward end, a hook on the forward end of said cage engageable with the wall of the opening in said receptacle for supporting said forward end of said cage on the nest covering the opening therein for receiving an animal therefrom, a hook pivotally mounted for vertical swinging movement on the rear end portion of the cage and engageable with an upper portion of the wire housing for suspending said rear end portion of said cage therefrom, and a closure in the forward end portion of the cage.

References Cited in the file of this patent
UNITED STATES PATENTS

| | | |
|---|---|---|
| 1,255,798 | Schuckman | Feb. 5, 1918 |
| 1,461,681 | Schuckman | July 10, 1923 |
| 2,073,373 | Kahn | Mar. 9, 1937 |